United States Patent [19]

Wirsing

[11] Patent Number: 5,607,198
[45] Date of Patent: Mar. 4, 1997

[54] AUTOMOTIVE WINDOW GLASS STABILIZER

[75] Inventor: Timothy A. Wirsing, Saginaw, Mich.

[73] Assignee: General Motors Corporation, Detroit, Mich.

[21] Appl. No.: 409,247

[22] Filed: Mar. 24, 1995

[51] Int. Cl.⁶ ........................................ B60J 1/17
[52] U.S. Cl. .................. 296/146.16; 49/377; 49/492.1; 296/146.2
[58] Field of Search .................. 296/146.1, 146.2, 296/146.3, 146.15, 146.16; 49/377, 492.1; 24/297, 453

[56] References Cited

U.S. PATENT DOCUMENTS

| | | |
|---|---|---|
| 2,523,839 | 9/1950 | McKinney ..................... 49/492.1 X |
| 2,782,069 | 2/1957 | Storch ........................... 49/377 |
| 3,116,528 | 1/1964 | Poe ................................ 24/297 X |
| 3,494,244 | 2/1970 | Wayland ....................... 24/453 X |
| 3,763,596 | 10/1973 | Anderson ..................... 49/492.1 X |

Primary Examiner—David M. Mitchell
Assistant Examiner—Kia M. Robinson
Attorney, Agent, or Firm—Ernest E. Helms

[57] ABSTRACT

An automotive vehicle extendable window glass stabilizer for laterally stabilizing a window glass with a body of an automotive vehicle is provided including a support generally extending from the automotive body laterally toward the window glass, a fabric mat mounted on a support extending toward the window glass, and a plastic button surrounded by the fabric mat. The button has a head providing a bottoming-out contact surface for the window glass when the glass more fully compresses the fabric mat.

11 Claims, 1 Drawing Sheet

5,607,198

AUTOMOTIVE WINDOW GLASS STABILIZER

FIELD OF THE INVENTION

The field of the present invention is that of stabilizers used in laterally stabilizing the glass in extendable windows in automotive vehicles.

BACKGROUND OF THE INVENTION

There are two major types of automotive doors with extendable glass. In one type of automotive door, the glass is supported above a belt line of the automotive door. This type of door is mainly utilized in full-size vehicles, especially large luxury vehicles. The second type of automotive door is referred to as a hard-top door. In the hard-top door, the glass is unsupported above the belt line of the automotive door. The hard-top door is popular in sports-type vehicles or in convertibles.

An excellent example of an automotive hard-top door is shown in commonly-assigned U.S. Pat. No. 5,340,976 to Wirsing. In the hard-top door, all support of the door is below the belt line. Before the present invention, a compromise between two factors typically had to be made. Typically, the glass is laterally supported on the outboard side of the door by the seal which seals the window glass to prevent water from entering the cabin of the door. On the inboard side, the glass is typically supported by what is commonly referred to as a stabilizer. Window glass being a rigid ceramic is an ideal amplifier for any vibrational noises. Therefore, to minimize vibrational noise, the glass is allowed a fair amount of play to prevent the generation of squeal noise when the window is moved up or down. This is especially critical when the glass is wet. However, the play in the lateral support of the glass presents another problem of rattle when shutting the door when the glass is not fully retracted or extended upward. Although this rattling noise has little or no effect on the operational characteristics of the vehicle window system, it does sometimes generate customer dissatisfaction. Accordingly, a battle rages between these two conflicting desires—the elimination of squeal noise in the operation of the window, especially when the glass is wet, versus a rattling noise which is generated when the window door is shut, generating lateral forces in the window glass up to and approaching 65 pounds.

SUMMARY OF THE INVENTION

To bring deliverance to the conflict that rages between the desire to eliminate both squeal and rattling noise, a revelation of the present invention is brought forth. In a preferred embodiment, the present invention provides a window glass stabilizer which has an elastomeric base covered by a polypropylene fabric. Additionally, there is provided a plastic button surrounded by the fabric. When the window glass more fully compresses the fabric mat of the polypropylene, the glass then engages the button, preventing the generation of squeal noise while at the same time allowing lateral stabilization of the glass to the extent that rattling is prevented during a door slam.

DESCRIPTION OF THE PREFERRED EMBODIMENT

Figure 1:
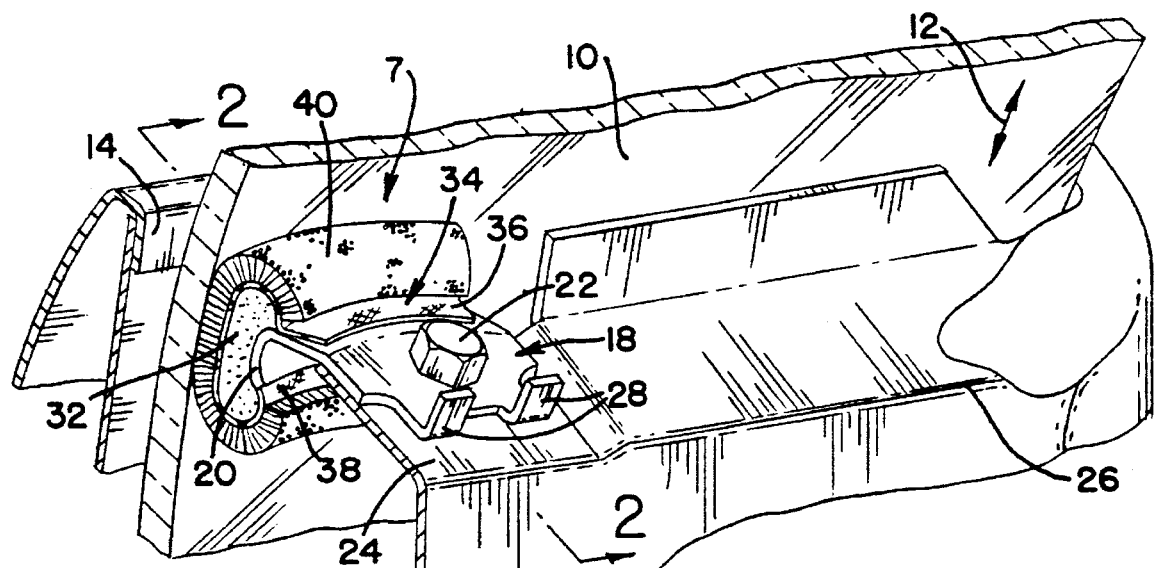
FIG. 1 is a perspective view of a preferred embodiment of the present invention utilized to stabilize an extendable window glass in an automotive vehicle door.
Figure 3:
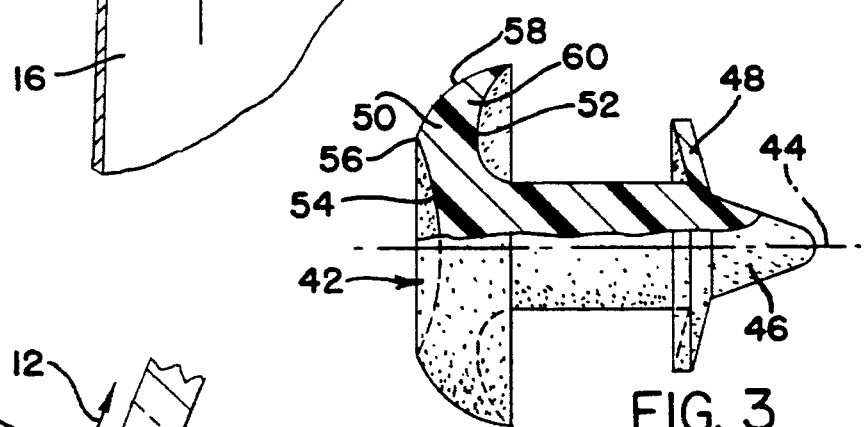
FIG. 3 is a sectional view of a button utilized in the stabilizer illustrated in FIGS. 1 and 2.
Figure 2:
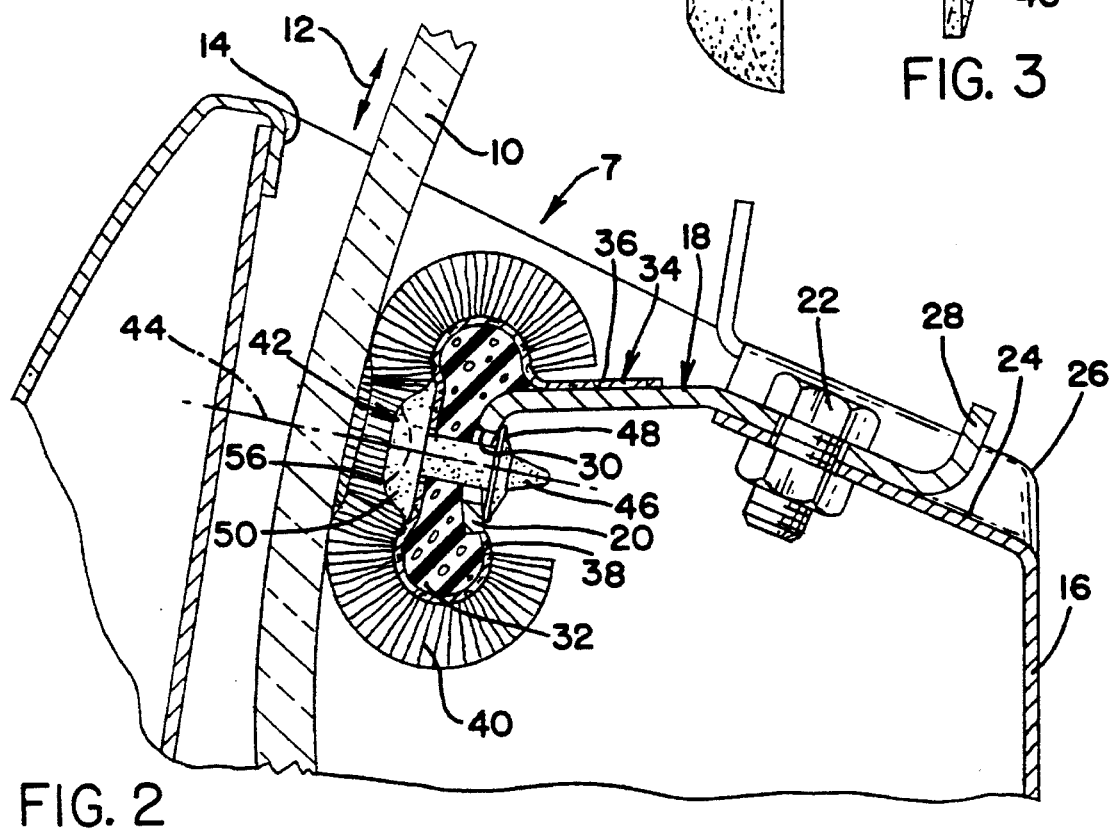
FIG. 2 is a view taken along line 2—2 of FIG. 1.

Referring to FIGS. 1 and 2, a window glass 10 which is extendable in the direction of arrows 12 is captured between an outer door panel 14 and an inner door panel 16.

Laterally supporting the door is a glass stabilizer 7. The glass stabilizer has a support 18 which has an integrally-joined foot 20. The stabilizer as shown is fastened by a bolt and nut fastener 22 to a flat 24 provided on the belt line 26 or a component attached to the inner door panel 16. In an embodiment not shown, the support 18 can instead be attached under the flat 24 by a rivet or other mechanical means, or it may simply be bonded. In the embodiment not shown, the flat will have a slot against which a tab 28 of the support can bottom out to ensure proper locational attachment of the support 18. The support 18 is fabricated to be generally rigid. The support 18 also has a drilled or punched aperture 30 on its foot 20.

Adhesively joined to the foot 20 of the support 18 and juxtaposed between the foot 20 and the outer panel 14 is a compliant elastomeric base 32. A typical base is a black close cell sponge five millimeters high with a SCE-41 specification.

Adhesively placed over the base 32 material is a fabric backing material 34. The fabric backing material also has legs 36 and 38 which are adhesively joined to the support 18.

Joined to the fabric backing 34 are fabric fibers 40 made from polypropylene typically five millimeters long which have been highly treated with silicone.

A nylon or other suitable hard plastic button 42 has an axial center line 44 which is generally perpendicular to a tangent of the glass 10. The button 42 has a puncture tip 46 which is used to penetrate the fabric backing 34 and the base 32 to allow the button to enter into aperture 30. Reversely inclined flange 48 pushes against the rear side of the foot 20 to place the button 42 in tension and thereby also cause the fabric backing 34 and base 32 to be placed into compression. The tensioning of the base causes the surrounding area of the base to expand, pushing the fibers 40 around the button 42 and closer to the window glass. The button 42 also has a head 50 which has an undercut 52. On top of the head 50 is a dished cut out 54 to provide a circular blade cut-out surface 56. The cut out 54 prevents large area contact of the button to the glass, reducing the opportunity for the button 42 to mar the glass surface. Undercut 52 and a radial taper 58 of the head 50 combine to virtually eliminate all of the fibers 40 from reaching the circular blade or bearing ring surface 56. Between the tapered sides 58 and 52 of the head 50, there is a portion 60 which flexes into the base, entrapping some of the fabric hairs. Undercut 52 allows the button 42 to embed itself into the substrate, preventing the button 42 from moving up and down during glass cycling up and down.

In operation, when the window glass is extended upwardly or downwardly, under most circumstances it will most likely primarily be engaged by the fibers 40. If a situation occurs which is likely to cause squeal, after more fully compressing the fibers 40 the glass will bottom out against the blade surface 56. The fibers 40 also keep the area around the button 42 clean. Even when the fibers 40 are wet, the bottoming out against blade surface 56 will prevent sufficient force to be applied against the fabric material, which would result in the generation of squeal. Additionally, squeal is eliminated by the button 42 keeping the base and the fabric backing 34 in compression, thereby eliminating the prior stick/slide relationship between the base, fabric and window glass which was responsible for much of the generation of prior squeal. With the present design, lateral forces against the glass up to 12 pounds can be made without the generation of squeal in the demanding wet condition of the window glass. Typically, the button 42 will be made from a nylon material.

While this invention has been described in terms of a preferred embodiment thereof, it will be appreciated that other forms could readily be adapted by one skilled in the art such as indoors other than hard top styles. Accordingly, the scope of this invention is to be considered limited only by the following claims.

I claim:

1. An automotive vehicle extendable window glass stabilizer for laterally stabilizing a window glass with a body of an automotive vehicle comprising:

a support generally extending from the automotive body laterally toward the window glass;

a fabric mat mounted on the support extending toward the window glass; and a plastic button, having an undercut, surrounded by the fabric mat, the button having a head providing a bottoming-out contact surface for the window glass when the glass more fully compresses the fabric mat.

2. An automotive vehicle glass stabilizer as described in claim 1 further including a compliant elastomeric base mounted on the support juxtaposed between the fabric mat and the support.

3. An automotive vehicle glass stabilizer as described in claim 1 wherein the button is mounted to the support through an aperture provided in the support.

4. An automotive vehicle extendable window glass stabilizer for laterally stabilizing a window glass with a body of an automotive vehicle comprising:

a support generally extending from the automotive body laterally toward the window glass, the support having an aperture;

a compliant elastomeric base mounted on the support juxtaposed between the support and the window glass;

a fabric mat supported on the base extending toward the window glass; and a polymeric button, having an undercut, extending through the support aperture and mounted to the support, the button being bordered by the base and the fabric mat, the button having a head providing a bottoming-out contact surface for the window glass when the glass more fully compresses the fabric mat.

5. An automotive vehicle window glass stabilizer as described in claim 1 wherein the plastic button has a cut-out to help define the contact surface.

6. An automotive vehicle window glass stabilizer as described in claim 4 wherein the button has a flange which pulls the head of the button away from the window glass, maintaining the button in tension.

7. An automotive vehicle window glass stabilizer as described in claim 4 wherein the button head also compresses the base and fabric mat.

8. An automotive vehicle window glass stabilizer as described in claim 4 wherein the button has a puncture point.

9. An automotive vehicle window glass stabilizer as described in claim 4 wherein the fabric mat is made from a polypropylene fabric.

10. An automotive vehicle window glass stabilizer as described in claim 9 wherein the polypropylene fabric is silicone treated.

11. An automotive vehicle extendable window glass stabilizer for laterally stabilizing a window glass with a body of an automotive vehicle comprising:

a support generally extending from the automotive body laterally toward the window glass, the support having a foot portion with an aperture;

a compliant foam rubber base mounted on the foot of the support juxtaposed between the support and the window glass;

a polypropylene fabric mat supported on the base extending toward the window glass; and a generally hard polymeric button having a head with a cut-out to provide a blade contact surface for the window glass when the window glass more fully compresses the fabric mat, the button head also having an undercut beneath the head, the button having a puncture head for puncturing the fabric and the base and the button having a flange contacting the foot for placing the button in tension, thereby compressing the base and fabric, and wherein the button is bordered by the base and the fabric mat.

* * * * *